United States Patent
Xu et al.

(10) Patent No.: US 11,225,603 B2
(45) Date of Patent: Jan. 18, 2022

(54) MECHANOLUMINESCENT MATERIAL, COATING CONTAINING MECHANOLUMINESCENT MATERIAL, MECHANOLUMINESCENT SUBSTANCE AND METHOD FOR PRODUCING MECHANOLUMINESCENT MATERIAL

(71) Applicant: National Institute of Advanced Industrial Science and Technology, Tokyo (JP)

(72) Inventors: Chao-Nan Xu, Tosu (JP); Dong Tu, Tosu (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 251 days.

(21) Appl. No.: 16/474,897

(22) PCT Filed: Nov. 10, 2017

(86) PCT No.: PCT/JP2017/040597
§ 371 (c)(1),
(2) Date: Jun. 28, 2019

(87) PCT Pub. No.: WO2018/135106
PCT Pub. Date: Jul. 26, 2018

(65) Prior Publication Data
US 2019/0345381 A1 Nov. 14, 2019

(30) Foreign Application Priority Data
Jan. 19, 2017 (JP) .............................. JP2017-007633

(51) Int. Cl.
C09K 11/64 (2006.01)
C09D 5/22 (2006.01)
C09D 201/00 (2006.01)
C09K 11/08 (2006.01)
C09K 11/77 (2006.01)

(52) U.S. Cl.
CPC ............... *C09K 11/64* (2013.01); *C09D 5/22* (2013.01); *C09D 201/00* (2013.01); *C09K 11/0838* (2013.01); *C09K 11/7706* (2013.01); *C09K 11/7734* (2013.01); *C09K 2211/186* (2013.01)

(58) Field of Classification Search
CPC .................. C09K 11/7706; C09K 11/7734
See application file for complete search history.

(56) References Cited

U.S. PATENT DOCUMENTS

| 6,159,394 | A * | 12/2000 | Akiyama | ............ C09K 11/562 |
| | | | | 116/212 |
| 6,280,655 | B1 | 8/2001 | Xu et al. | |
| 7,258,817 | B2 * | 8/2007 | Akiyama | ........... C09K 11/7734 |
| | | | | 252/301.4 R |
| 8,128,839 | B2 * | 3/2012 | Xu | .......................... F21K 2/04 |
| | | | | 252/301.4 R |
| 2004/0191518 | A1 | 9/2004 | Naito et al. | |
| 2016/0053172 | A1 | 2/2016 | Mori et al. | |

FOREIGN PATENT DOCUMENTS

| JP | S48046582 A | 7/1973 |
| JP | 2001049251 A | 2/2001 |
| JP | 2004323656 A | 11/2004 |
| JP | 2004352797 A | 12/2004 |
| JP | 2005179399 A | 7/2005 |
| JP | 2015067799 A | 4/2015 |
| WO | 2014157337 A1 | 10/2014 |

OTHER PUBLICATIONS

International Search Report dated Jan. 16, 2018 for PCT/JP2017/040597 and English translation.

* cited by examiner

*Primary Examiner* — C Melissa Koslow
(74) *Attorney, Agent, or Firm* — Lucas & Mercanti, LLP

(57) ABSTRACT

The purpose of the present invention is to provide a mechanoluminescent material which can be exhibit brighter luminescence compared to traditional SAO mechanoluminescent material even with respect to small strains and which has a relatively high mechanoluminescent capability even when left to stand for a long period of time after excitation. Provided is a strontium aluminate mechanoluminescent material containing Zr ions, characterized in that the Zr ions are contained in a reduced state, the content of the Zr ions is 10 mol % or less, and in a thermoluminescence measurement, one or more luminescence peaks are observed at a temperature of 100° C. or higher.

6 Claims, 3 Drawing Sheets

MECHANOLUMINESCENT MATERIAL, COATING CONTAINING MECHANOLUMINESCENT MATERIAL, MECHANOLUMINESCENT SUBSTANCE AND METHOD FOR PRODUCING MECHANOLUMINESCENT MATERIAL

CROSS REFERENCE TO RELATED APPLICATION

This Application is a 371 of PCT/JP2017/040597 filed on Nov. 10, 2017 which, in turn, claimed the priority of Japanese Patent Application No. 2017-007633 filed on Jan. 19, 2017, both applications are incorporated herein by reference.

TECHNICAL ART

The present invention relates to a mechanoluminescent material, a coating containing mechanoluminescent material, a mechanoluminescent substance and a method for producing mechanoluminescent material.

BACKGROUND ART

A mechanoluminescent material is a material emitting luminescence corelating to energy due to mechanical stimulation from the outside.

Among mechanoluminescent materials, a mechanoluminescent material belong to strontium aluminate group (hereafter, called as "mechanoluminescent material of SAO group") in which a main element contributing to light emission is added is known as one of representative mechanoluminescent materials and is expected for various uses such as sensor, nondestructive inspection, visualization of stress distribution, stress sensing and detection of abnormality • danger of structure and the like (for example, see PTL 1).

CITATION LIST

Patent Literature

PTL 1: Japanese Patent Application Laid Open No. 2001-049251

SUMMARY OF INVENTION

Technical Problem

By the way, as for the mechanoluminescent material of SAO group, there has been conducted various studies so as to indicate light emission with higher brightness through smaller stress. For example, it is attempted that material composition is changed by a method such as other element doping method and the like against the mechanoluminescent material of SAO group.

However, so far, it has been sought to discover an effective material which has high visibility for small strain of 2000 μST or less and realizes light emission with high brightness.

Further, in a case that the mechanoluminescent material of SAO group after excitation is put in darkness for a long period of time, it is general that mechanoluminescence intensity is attenuated due to carrier discharge. To retain more stable mechanoluminescence, it is necessary to rule predetermined light irradiation.

Further, in a case that cyclic stress is continuously added, although the mechanoluminescence intensity attenuates due to carrier discharge through stress addition, it is developed a pulse irradiation method and the like as means to obtain stable mechanoluminescence.

However, in the developed irradiation method, it is necessary light energy from the outside, thus this method may not be utilized in case of no energy source.

Further, even in a case that the mechanoluminescent material is stored in darkness for a long period of time after irradiation of excitation light, it is desired to retain high mechanoluminescent ability. Further, even in a case that stress is repeatedly and continuously added without light irradiation, it is desirable that retention rate of mechanoluminescence intensity is high.

The present invention has been done considering the above situation and has an object to provide a mechanoluminescent material through which light emission with high brightness can be indicated for small strain of 2000 μST or less in comparison with the conventional mechanoluminescent material of SAO group and which has comparatively high mechanoluminescent ability even in a case that the mechanoluminescent material is put for a long period of time after excitation.

Further, the present invention also provides a coating containing the mechanoluminescent material, a mechanoluminescent substance and a method for producing the mechanoluminescent material.

Solution to Problem

To solve above conventional problem, a mechanoluminescent material according to the present invention (1) comprises a mechanoluminescent material of strontium aluminate group containing Zr ions.

Further, the mechanoluminescent material according to the present invention is characterized in following points.

(2) the Zr ions are included in a reduced state
(3) content of the Zr ions is 10 mol % or less
(4) one or more luminescent peaks are observed at a temperature of 100° C. or more in a thermoluminescence measurement Further, the coating according to the present invention includes (5) any of the mechanoluminescent materials of above (1)~(4).

Further, the mechanoluminescent material is made by dispersing any of the mechanoluminescent materials of above (1)~(4) in a predetermined matrix material.

Further, the method for producing a mechanoluminescent material according to the present invention is a method for producing mechanoluminescent material of strontium aluminate containing Zr ions in which powder of strontium compound, powder of aluminum compound, powder of main element contributing to light emission and powder of zirconium compound are mixed and the obtained mixed powder is heated and baked, wherein baking atmosphere when baked is depressurized within a range of 100 kPa~0.01 Pa.

Advantageous Effects of Invention

According to the present invention, it can be provided a mechanoluminescent material, a coating, a mechanoluminescent substance and a method for producing a mechanoluminescent material in which light emission with high brightness can be indicated for a small stress of 2000 μST or less in comparison with the conventional mechanoluminescent material of SAO group and comparative high mechanoluminescent ability can be retained even in a case that the mechanoluminescent material, the coating or the mechanoluminescent substance is put for a long period of time after excitation.

DESCRIPTION OF EMBODIMENTS

Figure 1:
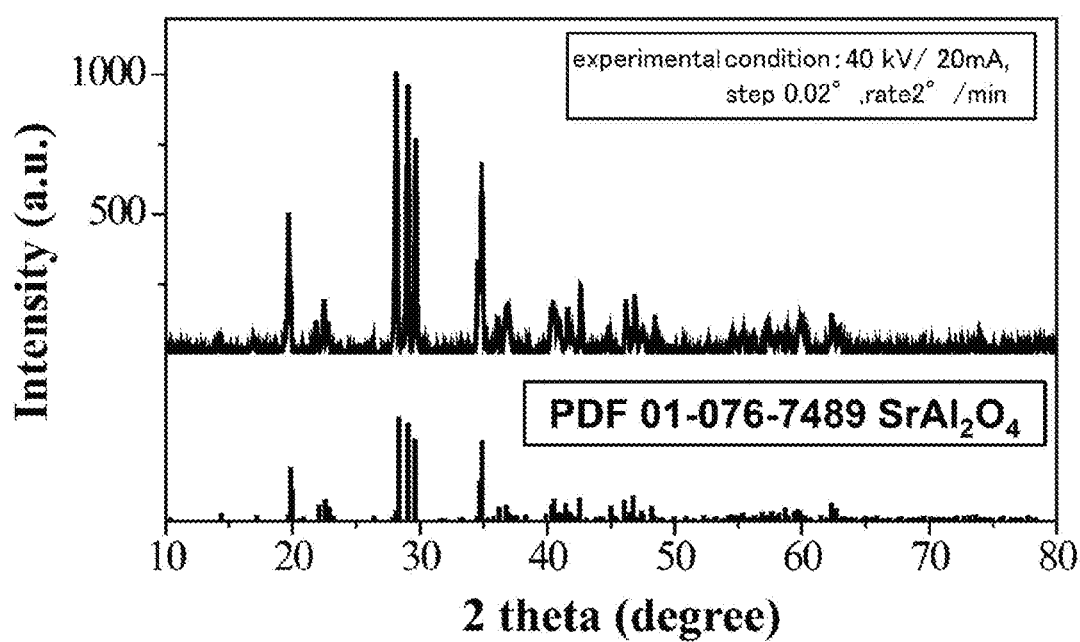
FIG. 1 is an explanatory view showing a result of XRD analysis.

The present invention provides the mechanoluminescent material of strontium aluminate group containing Zr ions.

Here, "containing Zr ions" can be understood that Zr ions exist under a state that Zr ion is substituted with an element such as strontium and the like constituting a base material of strontium aluminate group within the base material or that Zr ions are got inside crystal lattice of the base material, that is, can be understood that Zr ions are in a state of solid solution within the base material.

Here, as a conventional technology that Zr and the mechanoluminescent material mutually relate, although it is well-known that coating is conducted on the surface of the mechanoluminescent material of SAO group by zirconia, thereby water resistant is improved or stress propagation is improved, zirconia is precipitated as the second phase in any of these and its concept is quite different from the mechanoluminescent material according to the present embodiment in which Zr ions are introduced within crystal.

That is, the mechanoluminescent material according to the present embodiment has stoichiometric or non-stoichiometric composition represented by a general formula such as $Sr_zAl_2O_4:Q_xZr_y$ (here, Q is a main element contributing light emission mentioned later, a relation among x, y and Z is $0.9 \leq x+y+z \leq 1.1$, more preferably $0.95 \leq x+y+z \leq 1.05$, x,y, z>0). The mechanoluminescent material may be constituted from a single phase or mixed phase with the other crystal phase such as the second phase. Especially, even in a case that impurity phase such as zirconium oxide, strontium zirconate and the like is produced by addition of Zr, the mechanoluminescent material is included in the concept of the present invention so long as the crystal phase represented by the above general formula exists.

The main element contributing light emission included in the mechanoluminescent material according to the present embodiment is not particularly limited and, for example, it can be used alone or in combination of Scandium (Sc), Yttrium (Y) or elements belong to Lanthanoid group, that is, Lanthanum (La), Cerium (Ce), Praseodymium (Pr), Neodymium (Nd), Promethium (Pm), Samarium (Sm), Europium (Eu), Gadolinium (Gd), Terbium (Tb), Dysprosium (Dy), Holmium (Ho), Erbium (Er), Thulium (Tm), Ytterbium (Yb), Lutetium (Lu). The value of x in the general formula $Sr_zAl_2O_4:Q_xZr_y$, that is, amount of the main element Q contributing light emission is not particularly limited. However, for example, such amount may be set in a range of 0.01 mol % 10 mol %.

Further, according to the mechanoluminescent material according to the embodiment, luminescence with high brightness can be shown against small stress of 2000 μST or less, in comparison with the conventional mechanoluminescent material of SAO group. Moreover, comparatively high mechanoluminescence can be shown even in a case that the mechanoluminescent material is put for a long period of time after excitation.

In particular, although mechanoluminescence intensity is weak in the conventional mechanoluminescent material, thus stress detection by the naked eye is difficult, therefore expensive shooting equipment with high sensitivity is necessitated, the mechanoluminescent material according to the present embodiment has a good mechanoluminescent characteristic in comparison with the conventional mechanoluminescent material, therefore luminescence can be detected by the naked eye or cheap consumer equipment and it is extremely useful in the inspection side to inspect soundness of structure and the like.

It may be conceivable that the mechanoluminescent material according to the present embodiment is in a solid solution state containing Zr ions in the reduced state. Here, the Zr ions in the reduced state may be understood, for example, as trivalent Zr ions ($Zr^{3+}$) or divalent Zr ions ($Zr^{2+}$).

Outer shell electron of $Zr^{4+}$ is $sp^6$. On the contrary, $Zr^{3+}$ becomes $4d^1$ and $Zr^{2+}$ becomes $4d^2$. The Zr ions in the reduced state constitutes a new trap level for the mechanoluminescent material.

Further, based on that the mechanoluminescent material is constituted as in the above, it can be consistently realized the good high responsibility (high sensitivity) against small stress, the high brightness on a condition of small stress and the high mechanoluminescent ability (light emission over time) after a long period of time originating from good carrier retaining ability. Further, the mechanoluminescent material can possess extremely superior characteristics that visibility is high, high reproducibility for repeated stress addition is realized, afterglow is low after excitation and luminescence intensity for mechanical stimulation is high.

Further, a value of y in the general formula $Sr_zAl_2O_4:Q_xZr_y$, that is, although amount of Zr ions can be set in a range of 0.005 mol %~30 mol %, it may be set to a 10 mol % or less, concretely to a range of 0.005 mol %~10 mol %. Even in a case that the amount of Zr ions is set to the above range, the mechanoluminescent material according to the embodiment is extremely characteristic at the point that it can be realized high sensitivity and high brightness, good light emission over time.

Further, the mechanoluminescent material according to the present embodiment is characterized in that one or more emission peaks are observed at the temperature of 100° C. or more in the thermoluminescence measurement. Although this point will be later descried referring with the experimental data, this point contributes to coexistence of the high sensitivity, the high brightness and the light emission over time of the mechanoluminescent material according to the present embodiment.

Further, the present application also provides the coating containing the above mechanoluminescent material.

Although it is not particularly limited coating basic material to constitute the coating according to the present embodiment, for example, epoxy coating may be conceivable. As the epoxy coating, it may be preferable that the epoxy coating has low viscosity to an extension of 0.1~1000 mPa·s, low expansion rate and low curing shrinkage.

In a case that the coating is constituted according to the above, for example, when the non-distractive inspection is conducted, the coating is coated on a surface of the object, thereby both high permeability and high adhesion strength are demonstrated and sensitive and accurate inspection can be conducted together with excellent responsiveness originating from the mechanoluminescent material according to the present embodiment. Here, when the coating is coated, it can be adopted general film formation method such as screen printing, spray coating, brush coating and the like. As concrete object, for example, it may be conceivable a bridge, a water tank, a tank, a ship and the like. The coating exerts an effect in crack detection of these objects.

Further, the present application also provides a mechanoluminescent substance formed by dispersing the above mechanoluminescent material within a predetermined matrix material.

For example, resin having curability is made as the matrix material, and based on that the powdery mechanoluminescent material is dispersed in the resin before curing and the resin is cured, it can be easily formed the mechanoluminescent substance with a desired shape and excellent responsiveness originating from the mechanoluminescent material according to the present embodiment. In particular, as the matrix material, it is advantageous a resin curing at a room temperature.

Further, in a case that the matrix material can penetrate excitation light to excite the mechanoluminescent material mixed in the matrix material or radiation light radiated from the mechanoluminescent material, such matrix material is not particularly limited. In particular, it is desired as the matrix material a material in which stress added from the outside of the mechanoluminescent material is transmitted to the mechanoluminescent material and stress to an extent to trigger mechanoluminescence in the mechanoluminescent material can be given.

Here, as for a coating film formed when the coating according to the mentioned present embodiment is coated, such coating film can be understood as the mechanoluminescent substance according to the present embodiment.

Further, the present application provides a method for producing the mentioned mechanoluminescent material. More concretely, the present application also provides a method for producing the mechanoluminescent material of strontium aluminate group containing Zr ions.

In the method for producing the mechanoluminescent material according to the present embodiment, powder of strontium compound, powder of aluminum compound, powder of main element contributing to light emission and powder of zirconium compound are mixed and the obtained mixed powder is heated and baked.

Here, as each compound becoming raw material, carbonate or oxide can be, of course, utilized and various compounds such as nitrate, chloride, hydroxide, organic salt and the like can be utilized corresponding to the object as appropriate.

Further, when baking, it is extremely effective to add flux. The flux plays an important role to promote ion diffusion when Zr ions are introduced and stable defect structure is formed in a crystal. As the flux, for example, it can be utilized boric acid or $AlF_3$, $MgF_2$, $NH_4Cl$, $(NH_4)NO_3$ and the like.

Further, as the characteristic point in the method for producing the mechanoluminescent material according to the present embodiment, it can be raised, for example, a point that evacuation is done in preheating and depressurization to a range of 100 kPa-0.01 Pa is done when baked. This is, as shown in following reaction formula 1, because dry hydrogen atmosphere is always secured in baking atmosphere to introduce Zr ions, especially Zr ions in the reduced state in the crystal and to reduce partial pressure of $H_2O$. This is an extremely important point to produce the mechanoluminescent material according to the present embodiment.

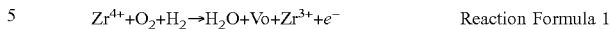

$$Zr^{4+}+O_2+H_2 \rightarrow H_2O+Vo+Zr^{3+}+e^-$$  Reaction Formula 1

Zr ions are reacted with oxygen ions in the crystal and hydrogen in the atmosphere, thereby $Zr^{4+}$ is reduced to $Zr^{3+}$ and $Zr^{2+}$ Thereby, it can be efficiently made solid solution of Zr ions, especially Zr ions in the reduced state in the mother material.

Further, deep oxygen ion vacancy produced at the same time of production of Zr ions in the reduced sate constitutes new trap level in the mechanoluminescent material. Since this trap level is deep, such trap level is stable in case of no mechanical stimulation. On the other hand, since the mechanoluminescent material has s structure susceptible to crystal field, the mechanoluminescent material can emit light due to small mechanical stimulation. That is, it can be produced the mechanoluminescent material with high sensitiveness, high brightness, good light emission over time.

Hereinafter, as for the mechanoluminescent material, the coating containing the mechanoluminescent material, the mechanoluminescent substance and the method for producing the mechanoluminescent material, there will be described referring with production examples, experimental examples.

[1. Preparation of Mechanoluminescent Material]

First, the mechanoluminescent material according to the present embodiment was prepared. Concretely, $SrCO_3$ of 11.5947 g, $Al_2O_3$ of 8.0564 g, $Eu_2O_3$ of 0.0695 g, $ZrO_2$ of 0.009736 g, $H_3BO_3$ of 0.0245 g (each of them is produced by Kojundo Chemical Laboratory Co., Ltd.) were weighed, thereafter were sufficiently mixed in a mortar and mixed powder sample was obtained.

Next, the obtained mixed powder sample was packed in a crucible and heat treatment was performed for 2 hours at 1073K in the atmosphere, thereby calcined sample was obtained.

Next, the obtained calcined sample was further mixed and packed in the crucible, thereafter was put in a firing furnace with high temperature vacuum atmosphere and baked through two-step heat treatment. In the first step heat treatment, the obtained calcined sample was heated to a preheating temperature (100~1500° C., for example 150° C.) while degassing and exhausting and preliminary vacuum heat treatment was conducted for 0.1~10 hours (for example, 2 hours) in 100 KPa~0.01 Pa.

Next, as the second step heat treatment, under atmosphere of dry inert gas such as Ar or $N_2$ and the like containing hydrogen (for example, 5% $H_2$—Ar atmosphere), the obtained calcines sample was retained for 1~10 hours (for example, 4 hours) under the normal pressure at a main firing temperature (1273~1873K, for example 1673K). Thereby, main baking was conducted and the main baked sample was obtained.

Further, the obtained main baked sample was crushed and classified, thereby it was obtained the mechanoluminescent material A1 according to the present embodiment which is powdery and has an average particle size of 2 μm. Composition of this mechanoluminescent material A1 was $Sr_zAl_2O_4:Eu_xZr_y$ (x=0.005, y=0.001, z=0.994).

Further, XRD analysis was conducted for the mechanoluminescent material A1. As a result, it was confirmed that the mechanoluminescent material exists in a single phase and priority growth of (004) is found.

Further, similarly to the above, there were prepared the mechanoluminescent material A2 in which amount of zirconium is set to intermediate value, that is, $Sr_zAl_2O_4:Eu_xZr_y$, (x=0.01, y=0.1, z=0.89), the mechanoluminescent material A3 in which amount of zirconium is set to the lower limit, that is, $Sr_zAl_2O_4:Eu_xZr_y$, (x=0.005, y=0.00005, z=0.995) and the mechanoluminescent material A4 in which amount of zirconium is set to the upper limit, that is, $Sr_zAl_2O_4:Eu_xZr_y$, (x=0.01, y=0.3, z=0.69). Here, as the flux amount utilized during synthesis, it was added necessary and sufficient amount of the flux to diffuse Zr ions, for example, synthesizing was conducted by adding flux amount corresponding to mol % as same as the Zr addition amount. Although illustration was omitted, the XRD analysis data as same as that of the mechanoluminescent material A1 was obtained for these mechanoluminescent materials A2, A3 And A4.

[2. Production of Mechanoluminescent Substance]

Next, as the mechanoluminescent substance according to the present embodiment, generation of mechanoluminescent pellet was conducted. The mechanoluminescent material A1 of 0.5 g and low expansion epoxy resin of 2.5 g were mixed and pasted, further were poured into a columnar plastic mold and cured at a room temperature. After curing, such material was pulled out from the plastic mold, thereby mechanoluminescent pellet B1 with a size of diameter 25 mm×thickness 9 mm was obtained. Similarly, mechanoluminescent pellet B2 was prepared from the mechanoluminescent material A2, mechanoluminescent pellet B3 was prepared from the mechanoluminescent material A3 and mechanoluminescent pellet B4 was prepared from the mechanoluminescent material A4.

[3. Preparation of Mechanoluminescent Coating]

Next, as the coating according to the present embodiment, preparation of the mechanoluminescent coating was conducted. The mechanoluminescent material A1 of 10 g was added to epoxy resin of 10 g (mixture of main ingredient and hardening agent and adequate solvent) as the coating base and sufficiently mixed and dispersed, thereby mechanoluminescent coating C1 was obtained. Here, the coating after preparation has low viscosity 0.1~1000 mPa·s and high permeability, further has low expansion rate and low curing shrinkage rate. Similarly, mechanoluminescent coating C2 was prepared from the mechanoluminescent material A2, mechanoluminescent coating C3 was prepared from the mechanoluminescent material A3 and mechanoluminescent coating C4 was prepared from the mechanoluminescent material A4.

[4. Preparation of Comparative Material and the Like]

Next, to provide for following each test, it was prepared comparative material to compare with the mechanoluminescent material according to the present embodiment, comparative luminescent substance to compare with the mechanoluminescent substance according to the present embodiment and comparative coating to compare with the mechanoluminescent coating according to the present embodiment.

As the comparative material, 4 comparative materials of comparative material J1~J4 were prepared.

The comparative material J1 was prepared without conducting vacuum degassing when baked although the comparative material J1 has the composition as same as that of the mechanoluminescent material A.

The comparative material J2 is a material in which zirconium content deviates from the lower limit. To obtain $Sr_zAl_2O_4:Eu_xZr_y$, (x=0.005, y=0.00001, z=0.95), the comparative material J2 was prepared by the method as same as that of the mechanoluminescent material A.

The comparative material J3 is a material in which zirconium content deviates from the upper limit. To obtain $Sr_zAl_2O_4:Eu_xZr_y$, (x=0.005, y=0.035, z=0.645), the comparative material J3 was prepared by the method as same as that of the mechanoluminescent material A.

The comparative material J4 is a mechanoluminescent material of non-stoichiometric SAO group in which defect control is done and high brightness is given and $SrCO_3$ of 9.3318 g, $Al_2O_3$ of 8.0564 g, $Eu_2O_3$ of 0.0278 g, $BaCO_3$ of 2.4949 g, $Ho_2O_3$ of 0.0299 g, $H_3BO_3$ of 0.0245 g (each of them is produced by Kojundo Chemical Laboratory Co., Ltd.) were weighed, thereafter were sufficiently mixed in a mortar and mixed powder sample was obtained. And the comparative material J4 is prepared by applying the treatment as same as that of the mentioned mechanoluminescent material A against the obtained mixed powder sample. Composition of this comparative material is $Sr_zAl_2O_4:Eu_x\text{-}Ho_p$ (x=0.002, p=0.002, z=0.80).

Further, comparative pellet K and comparative coating L as the comparative luminescent substance were prepared according to the method of [2. Preparation of Mechanoluminescent Material] and [3. Preparation of Mechanoluminescent Coating]. Here, in the following description, for example, the comparative pellet K produced by the comparative material J1 is indicated as the comparative pellet K1, and the comparative coating L produced by the comparative material J2 is indicated as the comparative coating L2.

[5. Comparative Test 1 of Light Emission Over Time]

Next, as for the light emission over time of the mechanoluminescent material A1, the comparative test against the comparative material J4 was conducted by comparing with the comparative pellet K4 while utilizing the mechanoluminescent pellet B1 produced in [2. Preparation of Mechanoluminescent Substance].

Compressive stress of triangular waveform in a range of 0~the maximum 1000N was added to each pellet at a constant speed (3 mm/min) by utilizing the material testing machine (RTC-1310A produced by Orientec Co., Ltd.) and the mechanoluminescence intensity was measured at a room temperature through a light measurement system constituted from a photomultiplier tube (R645 produced by Hamamatsu Photonics K.K.) having quartz fiber (length 1 m) arranged at a position apart from a material surface by a constant distance (45 cm) and a photocounter (c5410 produced by Hamamatsu Photonics K.K.). Before measurement, each pellet was radiated for a constant time (1 minute) by a constant light source (lamp of 365 nm) and is retained in darkness for a constant time (5 minutes, 2 hours, 24 hours, 10 days, 30 days), thereafter it was started to add load. As a result, the mechanoluminescent material A1 indicated good light emission over time for a long period of time in comparison with the comparative material J4. In particular, as for retention rate of the mechanoluminescence intensity of the mechanoluminescent material A1, extremely excellent light emission over time was indicated so that it was indicated even after 30 days the mechanoluminescence intensity of 50% when measured after 5 minutes.

[6. Comparative Tests of Strain Dependency of Mechanoluminescent]

Next, comparative tests were conducted as control of the above comparative materials, to confirm strain dependency of mechanoluminescent of the mechanoluminescent material according to the present embodiment.

The mechanoluminescent coating C1 or the comparative coating L4 is coated on a test piece produced from SUS631 with a size of length 250 mm×width 20 mm×thickness 3 mm so that a film thickness of coating becomes approximately 80 μm and was provided for fatigue testing machine (MTS). Further, strain rate of the test piece was set to 1000 μSt/sec. Results were shown in FIG. 2.

Figure 2A:
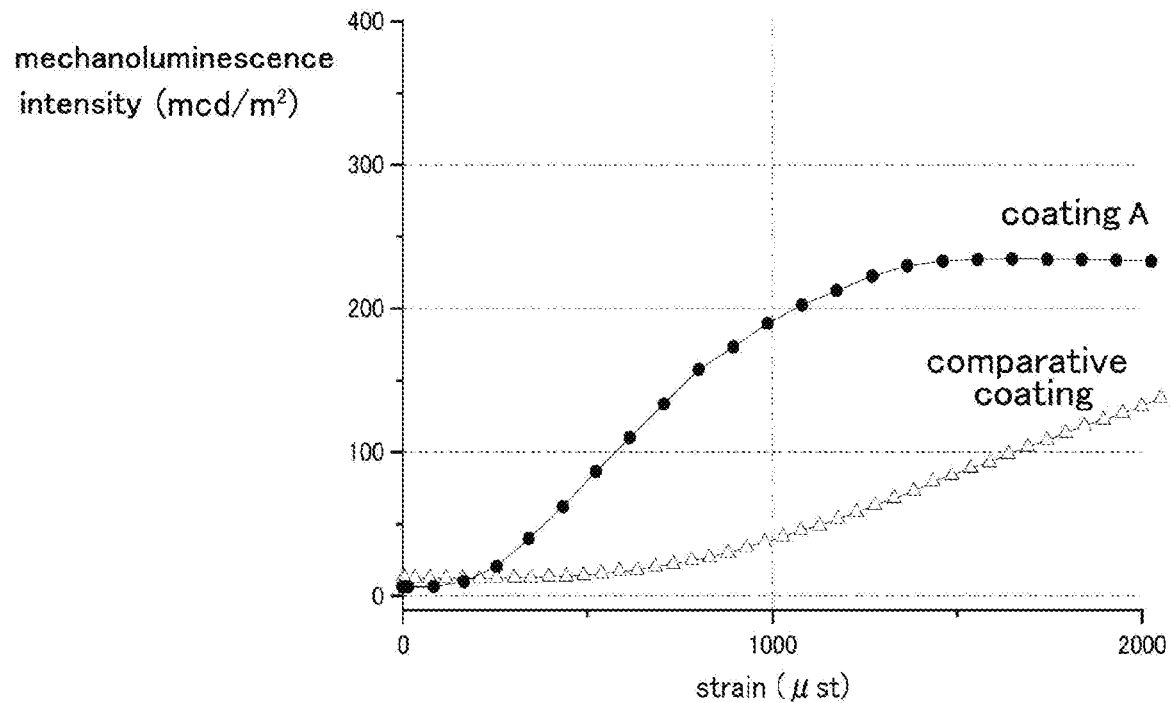
FIG. 2 is an explanatory view showing a mechanoluminescent characteristic.

FIG. 2A shows a test result obtained under a condition that excitation light with wavelength of 365 nm was irradiated for one minute and measurement was started after five minutes passed after termination of irradiation. Vertical axis indicates mechanoluminescence intensity and horizontal axis indicates strain. First, as understandable when seeing near origin, it was confirmed that afterglow of the mechanoluminescent material A1 (mechanoluminescent coating C1) in a state before strain was added was lower in comparison with the comparative material J4 (comparative coating L4).

Figure 2B:
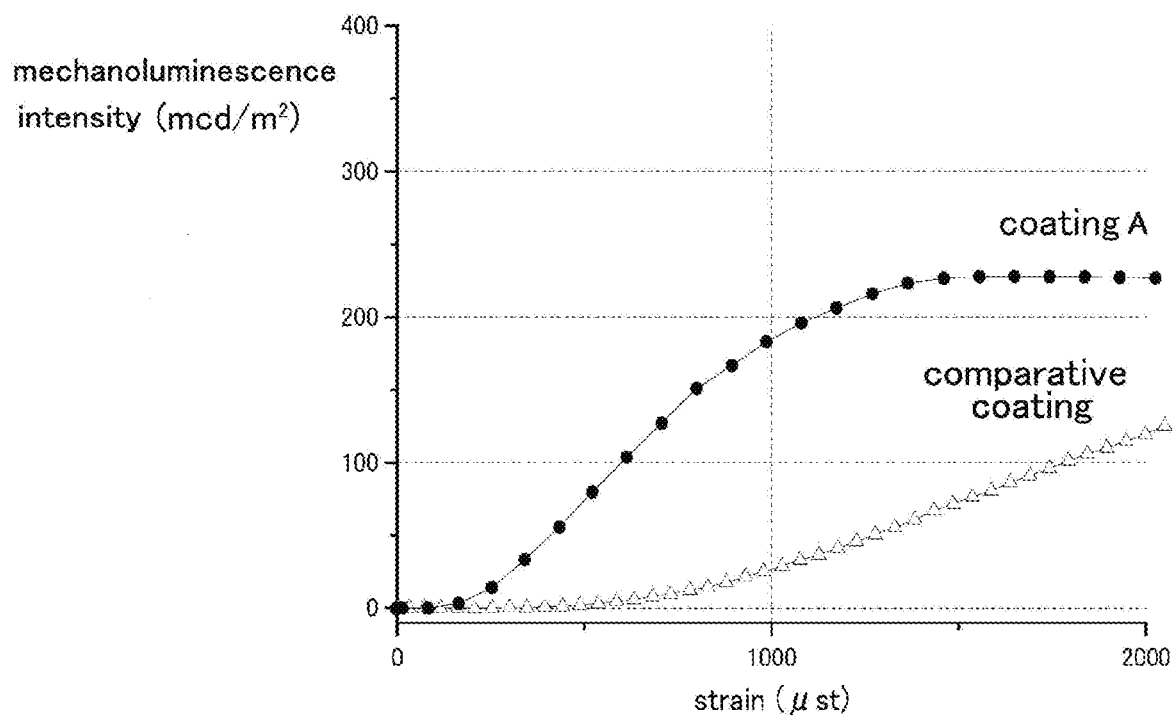

FIG. 2B shows data that deduction processing of afterglow strength was conducted for the data shown in FIG. 2A. As understandable from FIG. 2B, the mechanoluminescent material A1 indicated higher mechanoluminescence intensity in comparison with the comparative material J4 within a measurement range. In particular, the mechanoluminescent material A1 indicated higher mechanoluminescence intensity in comparison with the comparative material J4 under a small strain of 1000 μST or less. Concretely, under strain of 1000 μST, the mechanoluminescence intensity of the test piece on which the comparative coating was coated was 36 mcd/m$^2$, on the contrary, it was observed extremely strong luminescence of 180 mcd/m2 exceeding 100 mcd/m2 and 150 mcd/m2 for the mechanoluminescence intensity of the test piece on which the mechanoluminescent coating C was coated. Further, under small strain, it could be understood that the mechanoluminescent material A1 indicated luminescence with high sensitivity.

Further, in table 1, there are indicated the mechanoluminescence intensity data of the mechanoluminescent material A1 (mechanoluminescent coating C1)~the mechanoluminescent material A4 (mechanoluminescent coating C4), and the comparative material J1 (comparative coating L1)~the comparative material J4 (comparative coating L4), under 1000 μST, and as further example of the mechanoluminescent material according to the present embodiment, the mechanoluminescent material A5 (mechanoluminescent coating C5) which has composition approximately as same as that of the comparative material J4 and contrarily includes 0.1 mol % of Zr.

As understandable from Table 1, the same experiments as the above were conducted for the mechanoluminescent material A2 (mechanoluminescent coating C2), the mechanoluminescent material A3 (mechanoluminescent coating C3) and the mechanoluminescent material A4 (mechanoluminescent coating C4) and it was observed luminescence stronger than the comparative material J4 (comparative coating L4).

On the other hand, for the comparative material J1 prepared without decompression processing, the comparative material J2 in which the lower limit was deviated, remarkable improvement of luminescence intensity was not confirmed in any of them and good luminescent characteristic was not observed.

Further, as for the comparative material J3 in which the upper limit was deviated, although good result exceeding the comparative material J4 could be obtained, further improvement effect of brightness could not be expected, thus it was considered that the upper limit of Zr content was desirably 30 mol %.

[7. Comparative Tests 2 of Light Emission Over Time]

Next, concerning the mechanoluminescent material A1, as for light emission over time of the mechanoluminescent material according to the present embodiment, comparative tests with the comparative material J4 were conducted. Concretely, excitation light with wavelength 365 nm was irradiated to a test piece produced in [6. Comparative Tests of Strain Dependency of Mechanoluminescent] and it was compared the luminescence intensity under 1000 μST strain when measured after 24 hours passed from termination of irradiation.

As a result, the luminescence intensity in the test piece on which the comparative coating L4 was coated was about 5 mcd/m$^2$ and the retention rate was 16% when compared with a case that measurement was conducted after 5 minutes passed, as mentioned in the above. On the contrary, it was indicated a characteristic of extremely good light emission over time such that the luminescence intensity of the test piece on which the mechanoluminescent coating C1 was coated was 108 mcd/m$^2$ and the retention rate was 60%.

Further, as shown in Table 1 as the mechanoluminescent material A5, addition experiment of $ZrO_2$ for the comparative material J4 not containing Zr was conducted, as a result, it was confirmed that performance can be dramatically improved for both increase of the luminescence intensity

TABLE 1

| Material | Composition | Zr addition amount (mol %) | Mechanoluminescence intensity (mcd/m$^2$) |
|---|---|---|---|
| Mechanoluminescent material A1 | $Sr_{0.994}Al_2O_4:Eu_{0.005}Zr_{0.001}$ | 0.1 | 180 |
| Mechanoluminescent material A2 | $Sr_{0.89}Al_2O_4:Eu_{0.01}Zr_{0.1}$ | 10 | 90 |
| Mechanoluminescent material A3 | $Sr_{0.995}Al_2O_4:Eu_{0.005}Zr_{0.00005}$ | 0.005 | 70 |
| Mechanoluminescent material A4 | $Sr_{0.69}Al_2O_4:Eu_{0.01}Zr_{0.3}$ | 30 | 60 |
| Comparative material J1 | — | — | 40 |
| Comparative material J2 | $Sr_{0.95}Al_2O_4:Eu_{0.005}Zr_{0.00001}$ | 0.001 | 20 |
| Comparative material J3 | $Sr_{0.645}Al_2O_4:Eu_{0.005}Zr_{0.35}$ | 35 | 50 |
| Comparative material J4 | $Sr_{0.80}Al_2O_4:Eu_{0.002}Ho_{0.002}$ | 0 | 36 |
| Mechanoluminescent material A5 | $Sr_{0.80}Al_2O_4:Eu_{0.002}Ho_{0.002}Zr_{0.001}$ | 0.1 | 73 | against small strain and the retention rate by containing Zr ions. In a case that 0.1 mol % of Zr ions were added, the mechanoluminescent length of 1000 μST was strengthened about twice under the similar experimental condition and the retention rate was improved about twice.

[8. Thermoluminescence Measurement]

Figure 3A:
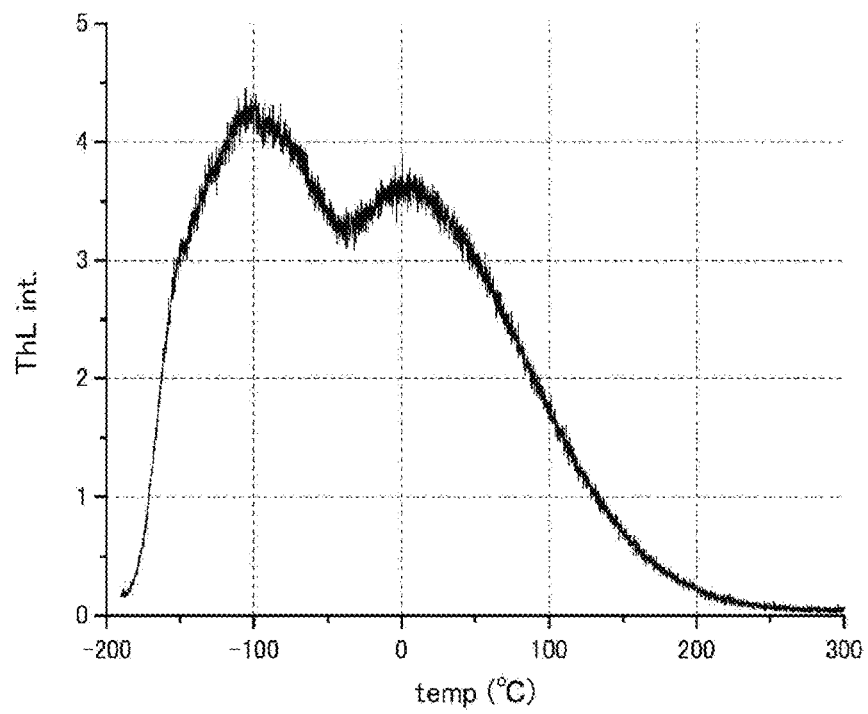
FIG. 3 is an explanatory view showing a result of thermoluminescence measurement.
Figure 3B:
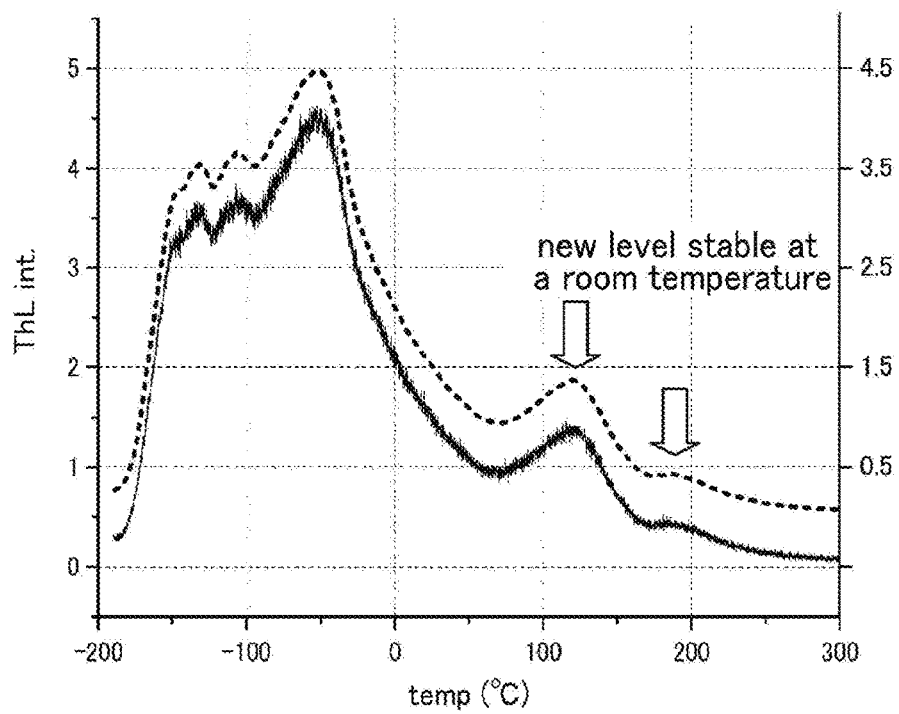

Next, thermoluminescence measurement was conducted to analyze structure trap contributing to luminescence of the mechanoluminescent material A1. It was measured within a range of −190° C.~300° C. under a heating condition of 30° C./minute. FIG. 3A shows a measurement result of the comparative material and FIG. 3B shows a measurement result of the mechanoluminescent material A.

As understandable by comparing with both results, in the mechanoluminescent material A1, it was observed a plurality of peaks (here, two peaks which are not peaks of high frequency component originated from signal strength difference in the minimum measurement temperature interval) having maximum values indicated by white arrows at a temperature of 100° C. or more. Here, a graph in which high frequency component is removed is shown by a dashed line in FIG. 3B. See a right second vertical axis for strength of the dashed line graph. The inventors consider for the peaks that new carrier structural level was formed by Zr ions entering into crystal under the reduced state and oxygen ion vacancy according to this.

The thermal luminescent peak at a temperature of 100° C. or more is generally deep, thus it is considered difficult to discharge carrier. On the other hand, there is a characteristic that these peaks are stable at a room temperature, thus such peaks are retained for a long period of time and not attenuated, different from peaks contributing to afterglow.

Further, the thermal luminescent peaks at a temperature of 100° C. or less attenuates according to time to leave. This coincides with general attenuation tendency of afterglow according to time to leave at a room temperature after light irradiation.

Based on that Zr ions in the reduced state, that is, $Zr^{3+}$ or $Zr^{2+}$ in which outer shell electron is d electron is introduced, deep oxygen vacancy produced simultaneously with Zr ions in the reduced state constitutes new trap level in the mechanoluminescent material. Since this level is deep, such level is stable when mechanical stimulation does not exist. On the other hand, since such mechanoluminescent material has the structure easily influenced by crystal field, luminescence can be done by small mechanical stimulation.

Here, although illustration will be omitted, thermal luminescent peaks are confirmed at a temperature of 100° C. or more similarly to the above also in the mechanoluminescent material A2, the mechanoluminescent material A3 and the mechanoluminescent material A4.

As mentioned in the above, since the mechanoluminescent material A according to the present embodiment is constituted from the mechanoluminescent material of strontium aluminate group containing Zr ions, it can be shown luminescence with high brightness for small strain of 2000 μST or less in comparison with the conventional mechanoluminescent material of SAO group. Therefore, it can be provided the mechanoluminescent material with comparatively high mechanoluminescent ability even when put for a long period of time after excitation.

Finally, description of each embodiment mentioned above is one example of the present invention and the present invention is not limited to the mentioned embodiments. Therefore, other than the mentioned each embodiment, various modifications can be, of course, done corresponding to design and the like within a scope not deviating the technical concept according to the present invention.

The invention claimed is:

1. A mechanoluminescent material comprising a strontium aluminate compound containing Zr ions,
    wherein the strontium aluminate compound is represented by a formula: $Sr_zAl_2O_4:Q_xZr_y$, wherein Q is a main element contributing light emission, x, y, and Z satisfy $0.9 \leq x+y+z \leq 1.1$ and x, y, z>0,
    wherein the main element contributing light emission is at least one element selected from the group consisting of Scandium (Sc), Yttrium (Y), Lanthanum (La), Cerium (Ce), Praseodymium (Pr), Neodymium (Nd), Promethium (Pm), Samarium (Sm), Europium (Eu), Gadolinium (Gd), Terbium (Tb), Dysprosium (Dy), Holmium (Ho), Erbium (Er), Thulium (Tm), Ytterbium (Yb), and Lutetium (Lu), and
    wherein the Zr ions are in a reduced state.

2. The mechanoluminescent material according to claim 1, wherein a content of the Zr ions is 10 mol % or less.

3. The mechanoluminescent material according to claim 1, wherein one or more peaks are observed at a temperature of 100° C. or more in a thermoluminescence measurement.

4. A coating containing the mechanoluminescent material described in claim 1.

5. A mechanoluminescent substance produced by dispersing the mechanoluminescent material described in claim 1 in a matrix material.

6. A method for producing a mechanoluminescent material, comprising:
    mixing powder of strontium compound, powder of aluminum compound, powder of main element contributing to light emission and powder of zirconium compound; and
    heating and baking the obtained mixed powder,
    wherein a baking atmosphere in the baking is depressurized within a range of 100 kPa~0.01 Pa,
    wherein the mechanoluminescent material comprises a strontium aluminate compound containing Zr ions,
    wherein the strontium aluminate compound is represented by a formula: $Sr_zAl_2O_4:Q_xZr_y$, wherein Q is the main element contributing light emission, x, y, and Z satisfy $0.9 \leq x+y+z \leq 1.1$ and x, y, z>0,
    wherein the main element contributing light emission is at least one element selected from the group consisting of Scandium (Sc), Yttrium (Y), Lanthanum (La), Cerium (Ce), Praseodymium (Pr), Neodymium (Nd), Promethium (Pm), Samarium (Sm), Europium (Eu), Gadolinium (Gd), Terbium (Tb), Dysprosium (Dy), Holmium (Ho), Erbium (Er), Thulium (Tm), Ytterbium (Yb), and Lutetium (Lu), and
    wherein the Zr ions are in a reduced state.

* * * * *